(12) United States Patent
Yu et al.

(10) Patent No.: US 11,058,971 B2
(45) Date of Patent: Jul. 13, 2021

(54) OIL-WATER SEPARATOR FOR OFFSHORE WIND FARM

(71) Applicant: PowerChina Huadong Engineering Corporation Limited, Zhejiang (CN)

(72) Inventors: Huafeng Yu, Zhejiang (CN); Haifeng Qi, Zhejiang (CN); Chunlin Huang, Zhejiang (CN); Shengxiao Zhao, Zhejiang (CN); Qunyi Tang, Zhejiang (CN); Zhenzhou Sun, Zhejiang (CN); Dongliang Zhang, Zhejiang (CN); Jianping Yuan, Zhejiang (CN); Xianlin Jia, Zhejiang (CN); Wei Lou, Zhejiang (CN); Baofeng Zhang, Zhejiang (CN)

(73) Assignee: PowerChina Huadong Engineering Corporation Limited, Hangzhou (CN)

( * ) Notice: Subject to any disclaimer, the term of this patent is extended or adjusted under 35 U.S.C. 154(b) by 190 days.

(21) Appl. No.: 16/120,009

(22) Filed: Aug. 31, 2018

(65) Prior Publication Data
US 2019/0366238 A1    Dec. 5, 2019

(30) Foreign Application Priority Data

Jun. 4, 2018  (CN) .......................... 201810564290.0

(51) Int. Cl.
*B01D 17/02* (2006.01)
*B01D 17/12* (2006.01)
*F03D 80/70* (2016.01)

(52) U.S. Cl.
CPC ......... *B01D 17/0214* (2013.01); *B01D 17/12* (2013.01); *F03D 80/70* (2016.05); *F05B 2240/95* (2013.01); *F05B 2240/96* (2013.01); *F05B 2260/98* (2013.01)

(58) Field of Classification Search
CPC .... B01D 17/0214; B01D 17/02; B01D 17/12; F03D 80/70; F05B 2240/95; F05B 2240/96; F05B 2260/98
USPC ........................................................ 210/95
See application file for complete search history.

(56) References Cited

U.S. PATENT DOCUMENTS 4,915,823 A * 4/1990 Hall ................... B01D 17/0214
                                                     210/95
9,833,727 B1 * 12/2017 Ball, IV ............... B01D 17/045

* cited by examiner

*Primary Examiner* — Robert Clemente
*Assistant Examiner* — Akash K Varma

(57) ABSTRACT

Disclosed is an oil-water separator for offshore wind farms. The separator is arranged between an oil drain pipe and an accident oil tank, and has a cylindrical structure, and includes an oil storage compartment, a water storage compartment and a partition plate between them. The disclosure can ensure that the accident oil tank is empty under normal operating conditions so that a platform weight is reduced; and an insulation and an electric heating treatments are only performed at the oil-water separator to save insulation project quantity and energy consumption for heating; and a two-stage oil-water separation is achieved in the oil-water separator to avoid mixing oil droplets into water discharged from a water outlet.

10 Claims, 2 Drawing Sheets

OIL-WATER SEPARATOR FOR OFFSHORE WIND FARM

CROSS-REFERENCE TO RELATED APPLICATIONS

This application claims to Chinese application No. 201810564290.0 with a filing date of Jun. 4, 2018. The content of the aforementioned applications, including any intervening amendments thereto, are incorporated herein by reference.

TECHNICAL FIELD

The present invention relates to an oil-water separator for an offshore wind farm, which belongs to the field of offshore wind power generation.

BACKGROUND OF THE PRESENT INVENTION

With the rapid development of wind power industry in China, offshore wind power generation has progressed rapidly. In recent years, a large number of offshore wind farms under construction or planned construction have emerged. An offshore booster station or an offshore converter station, as a power output facility of an offshore wind farm, is essential to make an offshore wind farm. The oil-containing equipment in the offshore booster station or offshore converter station generally includes a main transformer, a diesel engine, a diesel oil storage tank, etc., and an oil leak may not happen to these equipments under normal conditions, but an active oil drain or oil leak may occur in case of fire or other accidents. In the case of a fire, in order to protect the main body of the main transformer and avoid a larger fire, the oil in the main transformer will be actively discharged; and a diesel engine and a diesel oil storage tank may rupture and oil may leak out. Offshore wind farms are constructed on offshore platforms and any oil emission will lead to irreversible environmental disasters. Therefore, it is necessary to set up an accident oil collection device at the offshore booster station or the offshore converter station to collect various types of accident oil on the platform instead of discharging the oil directly into the sea. However, in the event of an accident, a fire protection system is also activated at the same time, and a large amount of water is automatically ejected for extinguishing fire such that actually the discharged oil is mixed with a large amount of water. And actually, the accidental oil collection device cannot accommodate all the fire-fighting water, therefore, a separation of oil and water should be performed simultaneously and oil is stored in an accident oil storage tank while water is discharged directly into the sea.

Conventional technology relates to set up an accident oil tank (an accident oil collection device for offshore booster stations, ZL 201620150429.3), and the accident oil tank can not only separate oil and water, but also store the accident oil. However, the conventional accident oil tank has the following defects: (1) the accident oil tank is always filled with water (more than 100 tons of water under storage), which is unfavorable to structure stress for a heavy weight; (2) areas where winter temperature is below zero, in order to prevent the oil tank from losing an oil-water separation function due to freezing, and an insulation layer and an electric heating equipment require to be arranged at the periphery of the accident oil tank, and the insulation project may lead to large consumption of time and energy; (3) water discharged from a water outlet may be mixed with some oil droplets after only one oil-water separation.

SUMMARY OF THE PRESENT INVENTION

The technical problem to be solved by the present invention is as follows: an oil-water separator is provided to solve the problems of the conventional technology, which is arranged between an oil drain pipe and an accident oil tank, and is expected to achieve the following goals: (1) discharging a separated oil into the accident oil tank instead of separating oil and water in the accident oil tank such that the accident oil tank may maintain empty under normal operating conditions and thus reduce a weight of the platform; (2) an insulation and an electric heating treatments are only performed at an oil-water separator rather than at the accident oil tank, which could reduce quantities of insulation project and energy consumption; (3) a two-stage oil-water separation is achieved in the oil-water separator, so that the separation of oil and water is more thorough, and water discharged from a water outlet is avoided being mixed with oil droplets.

Technical solutions adopted by the present invention are as follows: an oil-water separator for offshore wind farms, and the oil-water separator is cylindrical and includes an oil storage compartment, a water storage compartment and a partition plate between the two compartments.

1. An oil inlet pipe is provided on top of the oil storage compartment, and the oil inlet pipe extends to a bottom of the oil storage compartment, and distance from the oil inlet pipe orifice to a bottom plate is generally 0.5~1.0 D (D is a diameter of the oil inlet pipe). Multiple oil inlet pipes can be applied as required, and connected respectively to different main transformer chambers, diesel engine chambers or diesel oil tank chambers.

2. An oil drain pipe is arranged on a side of the oil storage compartment, and the oil drain pipe is connected to an accident oil storage tank.

3. A water drain pipe is arranged on a side of the water storage compartment, and the water drain pipe extends to a bottom of the water storage compartment, and distance from the water drain pipe orifice to a bottom plate is generally 0.5~1.0 D (D refers to a diameter of the water drain pipe).

4. The partition plate is arranged between the oil storage compartment and the water storage compartment, and a bottom of the partition plate is provided with a drainage hole at a position away from the oil inlet pipe. The drainage hole is generally a rectangular hole, and a cross-sectional area of the drainage hole is not less than a cross-sectional area of the water drain pipe.

5. A setting height of the oil drain pipe H1, a setting height of the water drain pipe H2 and a height of the drainage hole may simultaneously meet the following two requirements:

① in order to ensure a complete separation of oil and water, the setting height H1 of the oil drain pipe should be greater than the setting height H2 of the water drain pipe, and the difference should meet the following in equation:

$H1-H2>0.1m;$

② in order to ensure a sufficient liquid level difference between the oil storage compartment and the water storage compartment, the setting height H2 of the water drain pipe should be high enough to meet the following in equation:

$H2>(H1-H2)/(1-Sg)+H3$ in the above in equation, Sg refers to a specific gravity of oil and the specific gravity of transformer oil is generally 0.9.

6. A vent hole of the oil storage compartment is provided on top of the partition plate and the water storage compartment, and the vent hole is round. Tops of the oil storage compartment (or may also be arranged at the water storage compartment) and the water drain pipe are respectively provided with a vent pipe, and the vent pipe is a 180 degree bend.

7. Liquid level observation tubes are provided outside the oil storage compartment and the water storage compartment, and the liquid level observation tube is a glass tube whose two ends are connected with a cylinder body.

8. Under normal operating conditions, water is stored both in the oil storage compartment and the water storage compartment of the oil-water separator, and the height of the water level is the same with the height of the drain pipe H2.

9. In the area where the minimum temperature in winter is lower than 0° C. and the water in the oil-water separator may freeze, the outer wall of the oil-water separator needs to be provided with insulation layer. If it is in a colder area, electric heating equipment is also required.

The advantages of the present invention are as follow.

1. Under normal operating conditions, water is stored both in the oil storage compartment and the water storage compartment of the oil-water separator, and the oil inlet pipe extends to the bottom of the oil-water separator, and an orifice of the oil inlet pipe is always submerged in water in the oil-water separator, therefore, the oil-water separator actually functions as a water seal tank mentioned in ZL 201620150429.3 (an accident oil collection device for offshore booster stations) to stop the spread of combustion gases.

2. The vent hole is provided between the oil storage compartment and the water storage compartment to make the two compartments connected, and a pressure balance is achieved between the oil storage compartment and the water storage compartment. However, liquid levels in the compartments are different because of the different density of oil and water. Therefore, the setting height of the oil drain pipe H1 is higher than the setting height of the water drain pipe H2, and H2>(H1−H2)/(1−Sg)+H3, which ensure that a liquid level difference always exists between the two compartments so that no matter how much oil-water mixture is input from the oil inlet pipe, oil or water can be separated and then discharged successfully.

3. The vent pipe arranged at the top of the oil storage compartment (or the water storage compartment) is used to ensure a balance between air pressure in the cylinder and atmospheric pressure to avoid blockage due to poor ventilation when draining oil. The vent pipe arranged at the top of the water drain pipe is used to ensure an avoidance of siphon effect when a large amount of water is discharged from the water drain pipe.

4. Liquid level observation tubes, arranged outside the oil storage compartment and the water storage compartment, are used for conveniently observing the water level in the cylinder body.

5. The outer wall of the oil-water separator needs to be provided with an insulation layer and an electric heating equipment in a cold area to prevent the oil-water separator from losing the oil-water separation function due to freezing.

The oil-water separator for offshore wind farms with simple structure and reliable function is achieved through a combination of the above functions. The device can quickly separate the oil-water mixture into oil and water, which are respectively discharged from the oil drain pipe and the water drain pipe; and the device can also function as a water seal tank to stop the spread of combustion gases and prevent fire from expanding.

DETAILED DESCRIPTION OF THE PRESENT INVENTION

Figure 1:
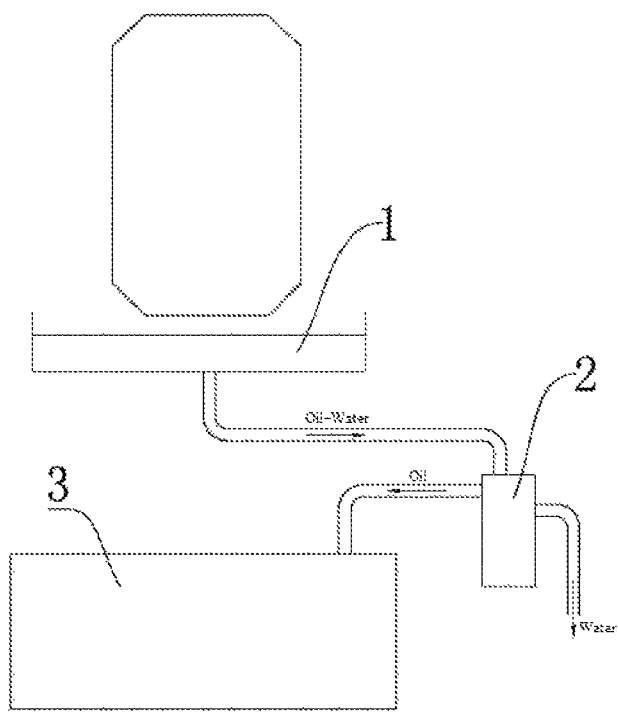
FIG. 1 is a schematic view showing an installation position of the oil-water separator in an embodiment.

Referring to FIG. 1, an oil-water separator for offshore wind farms is described in this embodiment. The oil-water separator is installed between a main transformer accident oil collection pit 1 and an accident oil storage tank 3. Function of the oil-water separator is to separate oil-water mixture discharged from the main transformer accident oil collection pit 1, and collect oil into the accident oil storage tank 3 and discharge water.

Figure 2:
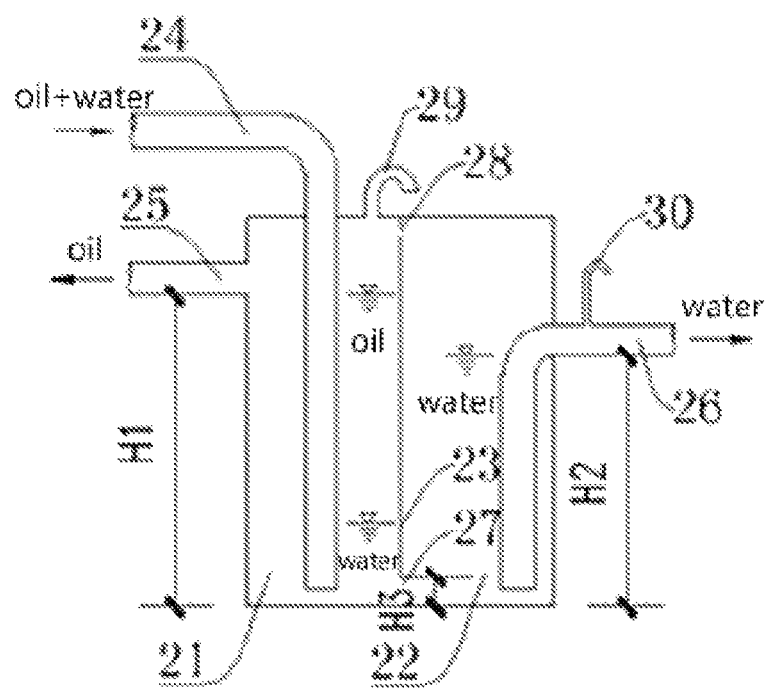
FIG. 2 is a cross-sectional view of the oil-water separator in an embodiment.
Figure 3:
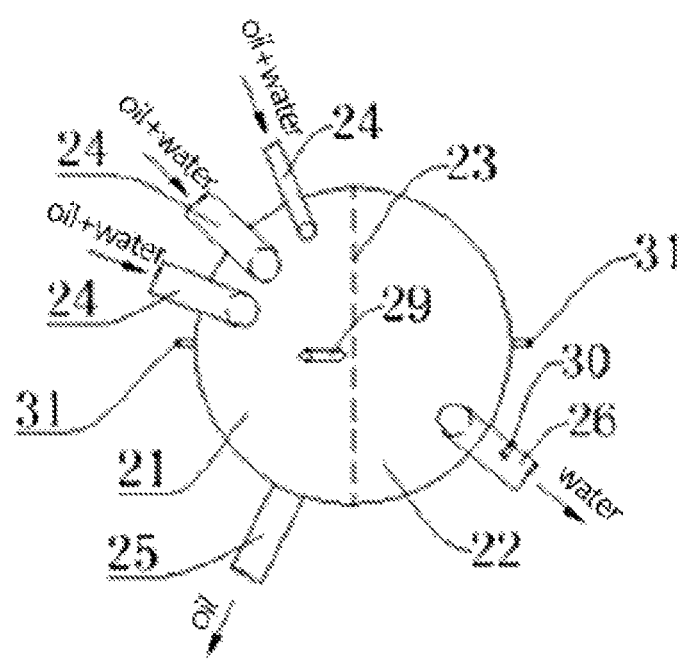
FIG. 3 is a plan view of the oil-water separator in an embodiment.

Referring to FIGS. 2 to 3, the oil-water separator 2 in this embodiment has a cylindrical structure and includes an oil storage compartment 21, a water storage compartment 22, and a partition plate 23 between the two compartments. A cylinder wall, a bottom plate, a top plate and the partition plate of the oil-water separator are all welded by steel plates with thickness of 8 mm. The total height and the diameter of the oil-water separator are 3 m and 1.5 m, respectively. The partition plate 23 is positioned at a center line of the cylinder, and the oil storage compartment 21 is the same with the water storage compartment 22 in size.

An oil inlet pipe 24 is arranged at top of the oil storage compartment 21, and the oil inlet pipe 24 extends to a bottom of the oil storage compartment 21. In this embodiment, a diameter of the oil inlet pipe 24 is 200 mm, and a distance from an orifice of the oil inlet pipe to a bottom plate of the oil storage compartment 21 is 100 mm. Three oil inlet pipes are adopted in this embodiment, and one of which is connected to a main transformer chamber, and the other one of which with a smaller diameter is connected to a diesel engine chamber.

An oil drain pipe 25 is arranged on a side of the oil storage compartment 21, and the oil drain pipe 25 is connected to the accident oil storage tank 3. A diameter of the oil drain pipe 25 is 200 mm in this embodiment.

A water drain pipe 26 is arranged on a side of the water storage compartment 22, and the water drain pipe 26 extends to a bottom of the water storage compartment 22. In the present embodiment, a diameter of the water drain pipe 26 is 200 mm, and a distance from an orifice of the water drain pipe 26 to a bottom plate of the water storage compartment 22 is 100 mm.

The partitioning plate 23 is arranged between the oil storage compartment 21 and the water storage compartment 22, and a drainage hole 27 is arranged at the bottom of the partition plate 23 at a position away from the oil inlet pipe 24. The drainage hole 27 is a rectangular hole and has a width and a height of 300 mm and 120 mm, respectively.

In this embodiment, the oil drain pipe 25 is provided with a setting height H1=2.6 m; the water drain pipe 26 is provided with a setting height H2=2.4 m; and the drainage hole 27 is provided with a height H3=0.12 m. A specific gravity of transformer oil in this embodiment is 0.9, which meets a condition of H2>(H1−H2)/(1−Sg)+H3.

Top of the partition plate 23 is provided with a vent hole 28 of the oil storage compartment 21 and the water storage compartment 22, and the vent hole is a round hole with a diameter of 50 mm. Vent pipes 29 and 30 are respectively arranged at tops of the oil storage compartment 21 and the water drain pipe 26. The vent pipe is an elbow having a curvature of 180 degree.

Liquid level observation tubes 31 are arranged outside the oil storage compartment 21 and the water storage compartment 22. The liquid level observation tube 31 is a glass tube, of which two ends are connected with a cylinder body.

Under normal operating conditions, water is stored both in the oil storage compartment 21 and the water storage compartment 22 of the oil-water separator, and a water level and the water drain pipe 26 share the same height of 2.4 m.

The operation process of the oil-water separator according to the embodiment is described as follows.

①  When a fire happens to a certain oil-containing equipment (such as the main transformer) and in order to prevent the fire from expanding, oil (such as an insulating oil of the main transformer) is discharged. Since fire-fighting water has also been ejected at this time, the main transformer oil pit 1 is filled with a mixture of oil and water, which is discharged into the oil-water separator 2 through a pipe.

② When a large amount of oil-water mixture is injected into the oil storage compartment 21 from the oil inlet pipe 24, an oil always floats on the upper portion of the oil storage compartment 21 due to a less density of oil than that of water, and a water at a bottom is discharged into the water storage compartment 22 through the drainage hole 27 at a bottom of the partition plate 23. With a continuous injection of an oil-water mixture, the oil is discharged from the oil drain pipe 25 at the upper portion of the oil storage compartment 22, and water is discharged into the water storage compartment 22 from the drainage hole 27 and then discharged through the drain pipe 26, thus forms a first oil-water separation.

③ In the water entering the water storage compartment 22, a small amount of oil droplets may be mixed, and oil always floats on top of the water storage compartment 22 according to a density difference of oil and water. Since an orifice of the drain pipe 26 extends to a bottom of the water storage compartment 22, water is always discharged through the water drain pipe 26, and a small amount of oil droplets mixed in is left at the top of the water storage compartment 22, thus forms a second oil-water separation.

④ Oil is discharged from the oil drain pipe 25 and stored in the accident oil storage tank 3. Water is discharged from the water drain pipe 26.

What is claimed is:

1. An oil-water separator for offshore wind farm, wherein the separator comprises an oil storage compartment, a water storage compartment and a partition plate between the oil storage compartment and the water storage compartment; a top of the partition plate is provided with a vent hole for communicating the oil storage compartment and the water storage compartment, and the vent hole is a round hole; and a bottom of the partition plate is provided with a drainage hole for draining water from the oil storage compartment to the water storage compartment.

2. The oil-water separator of claim 1, wherein an oil inlet pipe is arranged at a top of the oil storage compartment; the oil inlet pipe extends to a bottom of the oil storage compartment, and a distance from an orifice of the oil inlet pipe to a bottom plate is 0.5~1.0 D; wherein D is a diameter of the oil inlet pipe; multiple oil inlet pipes may be applied as required, and are connected respectively to different main transformer chambers, diesel engine chambers or diesel oil tank chambers.

3. The oil-water separator of claim 1, wherein an oil drain pipe is arranged on a side of the oil storage compartment, and the oil drain pipe is connected to an accident oil storage tank.

4. The oil-water separator of claim 1, wherein a water drain pipe is arranged on a side of the water storage compartment, and the water drain pipe extends to a bottom of the water storage compartment, and a distance from an orifice of the water drain pipe to a bottom plate is 0.5~1.0 D, wherein D is a diameter of the water drain pipe.

5. The oil-water separator of claim 2, wherein the bottom of the partition plate is provided with the drainage hole at a position away from the oil inlet pipe, and the drainage hole is generally a rectangular hole, and a cross-sectional area of the drainage hole is not less than a cross-sectional area of the drain pipe.

6. The oil-water separator of claim 1, wherein an oil drain pipe is arranged on a side of the oil storage compartment, and a water drain pipe is arranged on a side of the water storage compartment;

a height of the oil drain pipe is H1, a height of the water drain pipe is H2 and a height of the drainage hole is H3; wherein H1, H2 and H3 meet the following two requirements:
①H1−H2>0.1 m
②H2>(H1−H2)/(1−Sg)+H3; wherein Sg is a specific gravity of oil, and the specific gravity of transformer oil is 0.9.

7. The oil-water separator of claim 4, wherein a first vent pipe is provided in the oil storage compartment or the water storage compartment, and a second vent pipe is provided in the water drain pipe; and each of the first vent pipe and the second vent pipe is an elbow having a curvature of 180 degree.

8. The oil-water separator of claim 1, wherein liquid level observation tubes are arranged outside the oil storage compartment and the water storage compartment, and each of the liquid level observation tubes is a glass tube whose two ends are connected with a cylinder.

9. The oil-water separator of claim 4, wherein under normal operating conditions, water is stored both in the oil storage compartment and the water storage compartment of the oil-water separator, and a height of water level is the same with a height of the water drain pipe.

10. The oil-water separator of claim 6, wherein in an area where a minimum temperature in winter is lower than 0° C. and water in the oil-water separator may freeze, an outer wall of the oil-water separator is provided with an insulation layer, and if in a colder area, an electric heating equipment is provided.

* * * * *